United States Patent [19]

Isaacson

[11] 4,443,149

[45] Apr. 17, 1984

[54] AXIALLY MOVEABLE AUGER

[75] Inventor: Douglas T. Isaacson, West Fargo, N. Dak.

[73] Assignee: Bruce Halland, Fargo, N. Dak.

[21] Appl. No.: 305,948

[22] Filed: Sep. 28, 1981

[51] Int. Cl.³ .................. B65G 33/14; B65G 3/00
[52] U.S. Cl. .................. 414/326; 414/526; 414/315; 198/507; 198/511; 198/518
[58] Field of Search ............. 414/326, 304, 526, 315, 414/323, 144, 305, 586, 594; 198/625, 660, 661, 657, 671, 670, 507, 511, 518, 558, 675; 37/DIG. 6

[56] References Cited

U.S. PATENT DOCUMENTS

| 1,248,610 | 12/1917 | Caracristi | 414/326 |
| 2,055,725 | 9/1936 | Johnson | 198/661 |
| 2,558,006 | 6/1951 | Shriver et al. | 198/671 |
| 2,933,175 | 4/1960 | Gray | 198/660 |
| 3,017,008 | 1/1962 | Olson | 198/518 |
| 3,070,221 | 12/1962 | Bobrowski | 198/671 |
| 3,107,825 | 10/1963 | Reed | 198/660 |
| 3,409,119 | 11/1968 | Mayrath | 198/671 |
| 3,894,400 | 7/1975 | Stillwell | 198/518 |
| 4,220,434 | 9/1980 | Letzig | 198/671 |
| 4,226,477 | 10/1980 | Capoccia | 175/88 |

FOREIGN PATENT DOCUMENTS 268109 4/1964 Australia ................. 198/558

Primary Examiner—Bruce H. Stoner, Jr.
Assistant Examiner—James E. Barlow
Attorney, Agent, or Firm—Haller, James R.

[57] ABSTRACT

An auger assembly for transporting seed, fertilizer or other particulate material. The assembly provides an auger within a stationary tube; the auger is mounted to allow free axial movement between adjustable limits. In the normal augering position, the auger extends beyond the tube into the particulate material. Should the particulate material become packed or jammed, preventing the auger from turning, the auger can be driven in reverse, causing it to unscrew itself up into the tube and allowing the auger to then take a fresh bite at the particulate material.

6 Claims, 5 Drawing Figures

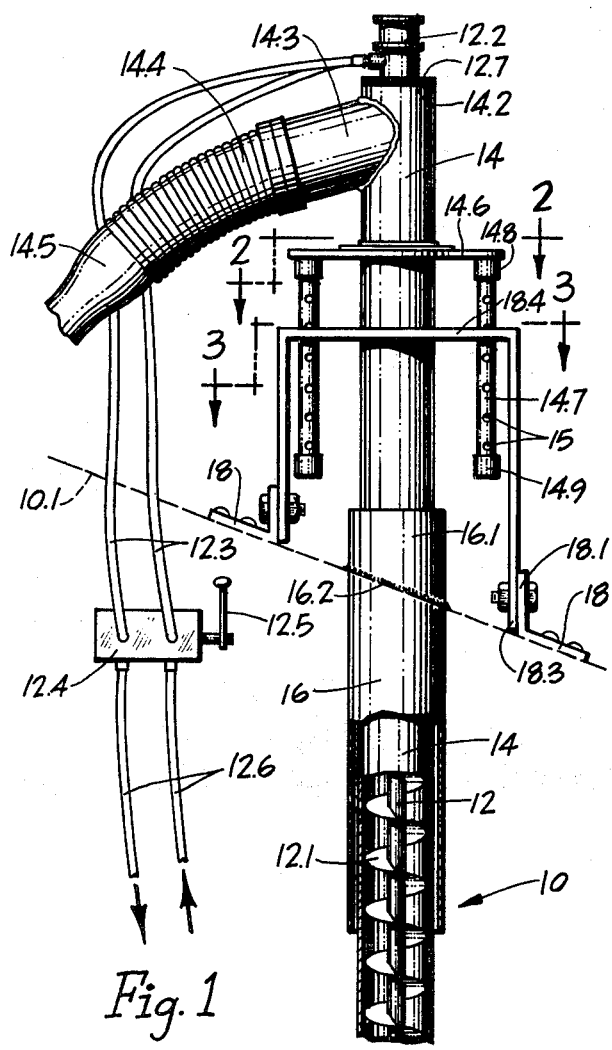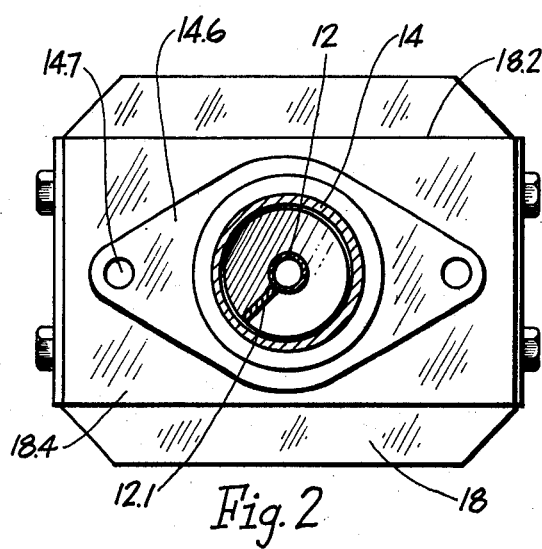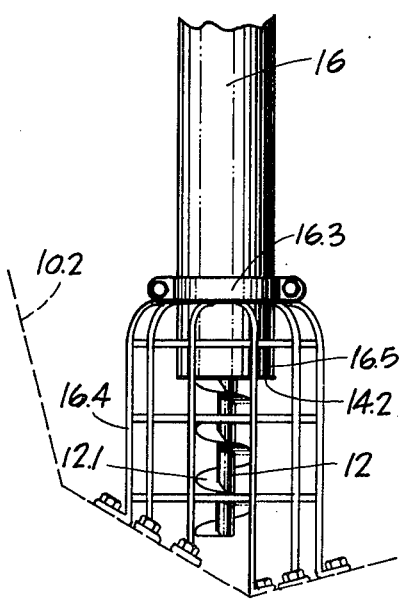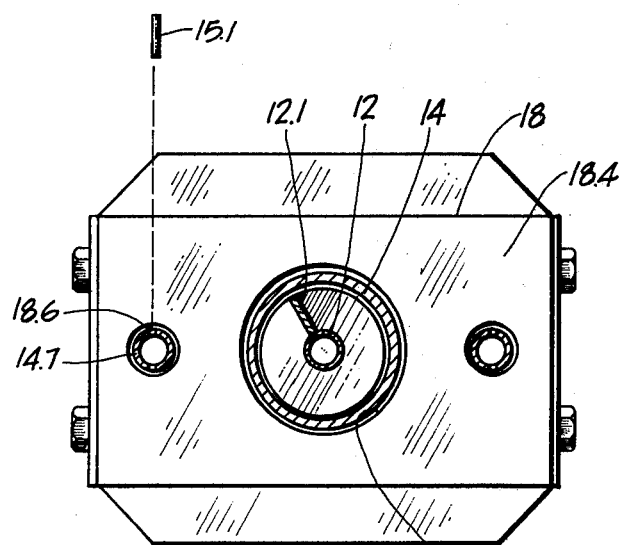
Fig. 1
Fig. 2
Fig. 3

AXIALLY MOVEABLE AUGER

TECHNICAL FIELD

This invention relates to the particle transport field, and particularly to the field of farm machinery in which particles such as fertilizer or seed particles are to be transported, for example, from a holding bin to a seed drill.

BACKGROUND ART

In the agricultural industry as well as in other industries there exists a need for transporting particles from one location to another. Particles may be transported by entrainment of the particles in a moving air stream, but such processes are expensive and are difficult to control. In the agricultural industry it is common to transport particles such as grain and fertilizer particles by means of augers. An auger commonly consists of a shaft bearing a helical ribbon that is rotatable within an enclosing tube termed an "auger tube." Although augers can be employed in various orientations, it is most common for the lower end of the auger, with at least some flights of the helical ribbon extending from the auger tube, to be placed in contact with the particulate material to be transported, the auger extending upwardly at an acute angle to the vertical and the particles being discharged from the upper end of the auger tube.

In a typical use, seed and fertilizer respectively are discharged from stationary holding tanks into portable, truck-mounted bins. The bins are transported to fields that are to be sown, and the seed and fertilizer within the bins are used to replenish the seed drills. The augers ordinarily are powered by hydraulic motors connected into the hydraulic systems of the trucks. At their upper ends, the auger tubes are provided with flexible discharge tubes or hoses permitting fertilizer and seed to be directed into the holding hoppers of seed drills.

Particulate materials such as seed and fertilizer often tend to pack down rather solidly at the bottom of a bin, this problem having been noted especially with particulate fertilizer. Because of this phenomenon, it is often difficult to initiate rotation of the shaft and helical ribbon within the auger tube, and in this condition, the augers often cannot be rotated in either direction. The problem must often be solved by emptying the bins by other means to free the auger, thereby delaying the planting procedure and giving rise to considerable frustration. It would be highly desirable to provide an auger system which would enable the auger to be quickly and automatically freed of blocking particulate matter at its particle receiving end so that the augering of particulate material could commence forthwith, but which would not require exceedingly heavy or expensive auger machinery nor unusually powerful auger rotating motors.

DISCLOSURE OF INVENTION

The invention relates to an auger system that can be readily freed of particles at its receiving end so that proper augering of seed or fertilizer or other particulate material can proceed. The system includes an auger, including a rotatable shaft bearing a helical ribbon, that is axially moveable in the direction of its particle-receiving end and also in the opposite direction, and an auger tube sheathing the auger.

In one embodiment, the auger system includes mounting means for mounting the auger to a bin or the like and providing the auger with freedom to move axially along its length toward and away from its receiving end between preset positional limits, the auger being urged axially in the direction of its receiving end during the particle transporting procedure by the interaction between the rotating helical ribbon and the particulate material to be transported, and the auger being moved axially away from its receiving position by reversal of the direction of rotation of the auger. In the latter situation the auger tends to unthread or unscrew itself from the particulate material, the interaction between the particulate material and the helical ribbon being such as to force the auger axially away from the direction of its particle-receiving end. Preferably, means limiting the axial movement of the auger toward and away from its particle-receiving end are provided, and means may also be provided to adjust the limit means to in turn adjust the limits between which the auger may axially move.

In the preferred embodiment, the auger assembly includes an auger rotatable about its axis, an auger tube sheathing the auger and having a lower, particle receiving end and an upper particle discharge end, means for rotating the auger in one direction to draw particulate matter within the particle-receiving end, means for reversing the direction of rotation of the auger, a stationary protecting outer tube within which the auger and auger tube are axially moveable as a unit, means preventing relative rotation of the auger tube with respect to the outer tube, and limit means limiting axial movement of the auger and auger tube within the outer tube, whereby reversal of the direction of the auger within the auger tube results in axial withdrawal of the auger and auger tube within the outer tube and away from particulate material tending to block rotation of the auger.

BRIEF DESCRIPTION OF THE DRAWINGS

FIG. 1 is a broken-away side view of an auger of the invention, as mounted to a bin shown in phantom lines;

FIG. 2 is a cross-sectional view taken along line 2—2 of FIG. 1;

FIG. 3 is a cross-sectional view taken along line 3—3 of FIG. 1;

BEST MODE FOR CARRYING OUT THE INVENTION

Figures 4, 5:
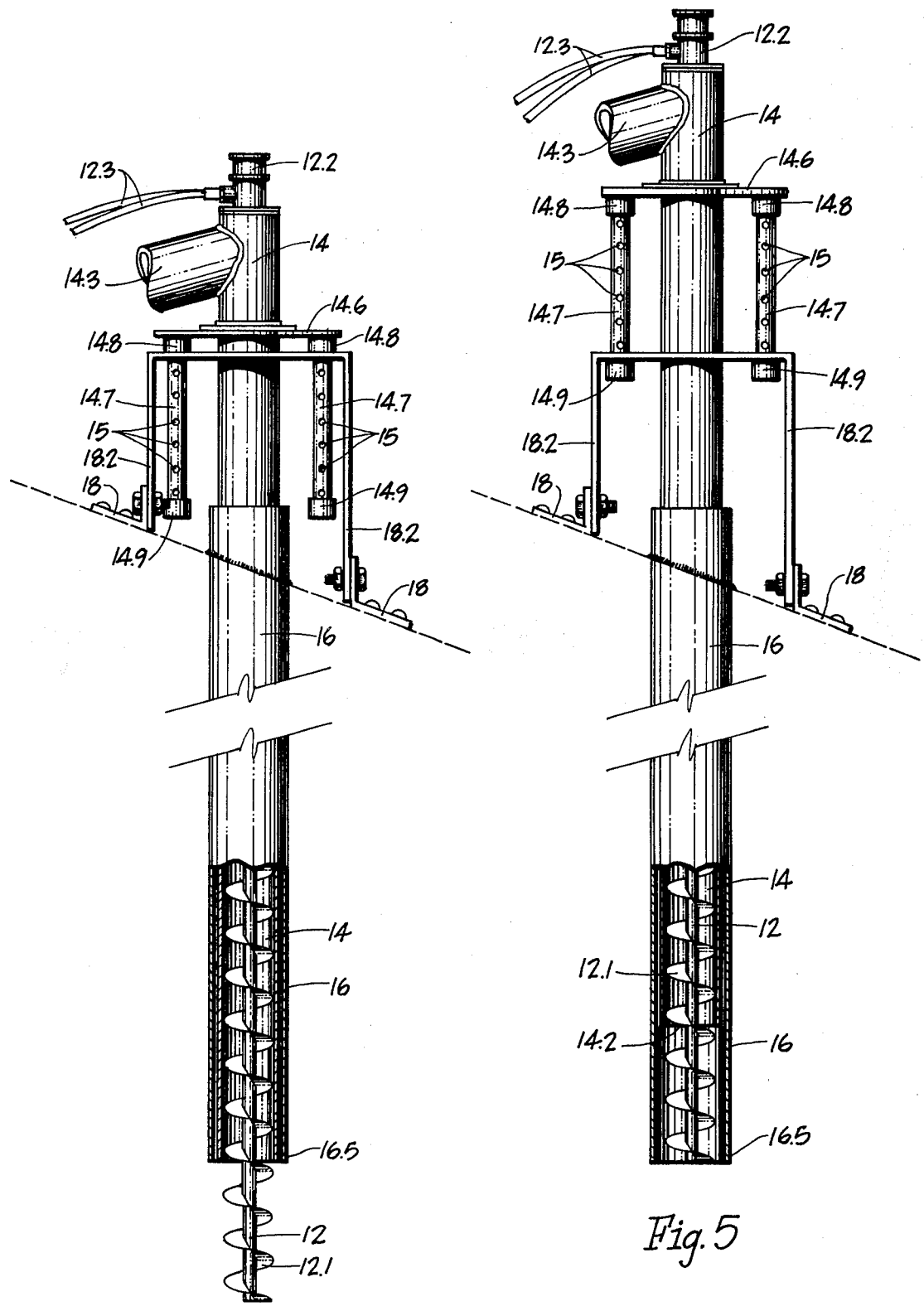
FIG. 4 is a broken-away view, in partial cross-section, showing an auger assembly of the invention in one position.
FIG. 5 is a broken-away view, in partial cross-section, showing the auger assembly of the invention in another position.

Referring to FIG. 1, the auger assembly of the invention is designated generally as (10), and is shown mounted to an upper wall (10.1) of a bin or hopper, the latter being illustrated in phantom lines. The upper wall (10.1) of the hopper may be generally horizontal, and represents an upper wall of a truck-mounted bin used for transporting seed or particulate fertilizer or other particulate material. Similarly, the phantom lines (10.2) represent the bottom, narrowed portion of the bin. The configuration of bins of the type described are well known, and no further description is required.

As shown in FIG. 1, the auger comprises a central shaft (12) to which is welded or otherwise affixed a helical ribbon (12.1), all in a well-known manner. The shaft (12) is attached at its upper end to a hydraulic motor (12.2). Hydraulic lines (12.3) carry hydraulic fluid under pressure between a hydraulic valve (12.4) and the motor (12.2). The valve (12.4) is of known design and has a "self-centering" feature such that when the handle (12.5) of the valve is released, no hydraulic fluid flows through the lines (12.3). Hydraulic lines (12.6) communicate the valve (12.4) with a source of hydraulic fluid under pressure, the latter commonly consisting of a hydraulic pump and reservoir of a type commonly employed in connection with trucks having hydraulic systems. As will be explained more fully below, it is desired that the valve (12.4) be set so that downward pressure on the handle (12.5) causes the auger shaft and attached helical ribbon to rotate in a direction causing particulate material in the bin to be drawn upwardly, whereas movement of the handle (12.5) upwardly causes the shaft and helical ribbon to rotate in the opposite direction. The lines (12.3) are of sufficient length to accommodate limited axial movement of the hydraulic motor (12.2), as will be explained in further detail below.

An auger tube (14) sheaths the auger shaft (12) and helical ribbon (12.1), and is provided with a plate (14.1) at its upper end to which the housing of the hydraulic motor (12.2) is rigidly mounted by means of a mounting flange (12.7) carried by the motor housing. The flange (12.7) and plate (14.1) are provided with suitable apertures permitting the auger shaft (12) to be connected to the drive shaft of the hydraulic motor, and sealing means (not shown, but common in the industry) are employed to restrain dust from within the auger tube from contaminating the hydraulic motor. As shown in FIGS. 1, 4 and 5, the auger protrudes a short distance—e.g., about 13 cm.—from the lower, particle-receiving end (14.2) of the auger tube.

As noted in the drawing and from the above description, the auger tube (14) is rigidly attached to the housing of the auger motor (12.2), and the auger shaft (12) is connected to the drive shaft (not shown) of the hydraulic motor (12.2), the shaft (12) thus being rotated by the hydraulic motor with respect to the auger tube (14).

Extending obliquely from the upper, particle-discharge end of auger tube (14) is a particle discharge tube (14.3) to which is attached a flexible, large diameter hose (14.4) terminating in an elongated, flexible hose (14.5). The end of the hose (14.5) may be moved as desired to direct particles transported by the auger into, e.g., a seed drill or other particle receiving device.

A protective outer tube (16) encloses the auger tube (14) throughout a portion of the length of the latter, the auger tube being slideably received within the outer tube. At its upper end (16.1), the outer tube (16) is welded (as shown at 16.2) or otherwise is rigidly affixed to the bin (10.1). The outer tube (16) extends downwardly adjacent the particle-receiving end (14.2) of the auger tube, and a clamp (16.3) of known design is provided at the lower end of the outer tube. A generally cylindrical tube or cage of rigid wire mesh, designated (16.4), is attached at its lower end to the bottom (10.2) of the bin and extends upwardly about the auger as shown in FIG. 1 for attachment to the clamp (16.3) by welding or the like. As thus described, the outer tube is rigidly attached at its upper and lower ends within the bin (10.1). The wire mesh tube or cage (16.4) may be of any convenient or desired shape, and serves to anchor the lower end (16.5) of the outer tube to the bottom of the bin while permitting particulate material to contact the auger.

Attached to the top wall (10.1) of the bin is a mounting bracket (18) having upstanding arms (18.1). A bracket plate (18.2), shown in the shape of an inverted "U", is connected at its lower ends (18.3) to the upwardly extending arms (18.1) by means of bolts or the like. The plate (18.2) has a generally flat upper wall (18.4) having a large, central orifice (18.5) (FIG. 3) through which loosely and slideably passes the auger tube (14). The latter tube is provided with an outwardly extending flange (14.6), the flange being welded or similarly rigidly affixed to the auger tube and overlying the upper wall (18.4) of the bracket plate (18.2). Extending downwardly from the flange (14.6) are guide pins (14.7), the latter passing downwardly slidingly through apertures (18.6) formed in the upper wall (18.4) of the bracket plate (18.2). The guide pins (14.7) desirably are identical, and, as depicted, may be short lengths of metal tubing. Each guide pin is provided with an expanded shoulder adjacent its attachment to the flange (14.6), the shoulder being of sufficient diameter as to come into contact with the upper surface of the bracket wall (18.4) as shown in FIG. 4. Similarly, shoulders (14.9) are provided at the lower ends of the guide pins (14.7), the shoulders having diameters sufficiently large as to prevent them from passing through the apertures (18.6) in the bracket plate (18). Small orifices (15) may be formed at regular intervals along the lengths of the guide pins (14.7), such orifices receiving positioning pins of sufficient length as to prevent the latter pins from passing through the orifices (18.6) of the bracket plate (18.2). The guide pins (14.7), shoulders (14.8 and 14.9) and positioning pins (of which one is shown at (15.1) in FIG. 3) coact with the bracket plate (18.2) to not only guide the auger tube (14) within the outer tube (16), but also to serve as means limiting the axial movement of the auger tube (14) within the outer tube (16). The small positioning pins (15.1) may be inserted as desired in the orifices (15) so as to adjust the axial movement afforded the auger tube.

The auger assembly of the invention may be attached to a bin or holding hopper or other container as desired, the lower end desirably being attached to the bottom of the container in a manner such as shown in FIG. 1. In a preferred embodiment, the outer tube (16) is thus rigidly and permanently attached at its bottom to the bottom of the container and at its upper end to an upper wall of the container and thus becomes a substantially permanent part of the container.

To auger particulate material from the bin, the auger shaft and helical ribbon are rotated in a direction that, in effect, tends to thread the helical ribbon downwardly into the particulate mass; since the downward axial movement of the auger and auger tube are limited by engagement of the shoulders (14.8) with the upper surface (18.4) of the bracket plate (18.2), the auger rotates without axial movement and particulate material is thus transported upwardly through the auger tube and thence outwardly through the particle discharge tube.

The self-centering valve (12.4) is mounted near the top of the bin. To start and maintain rotation of the auger, the handle (12.5) of the valve is pulled downwardly. In the event that particles have been permitted to settle and pack tightly at the bottom of the container (as occurs, for example, when a truck-mounted bin bearing fertilizer particles must travel over considerable distances on bumpy roads), the packed particles may prevent the auger from beginning its rotation. At this point, the direction of rotation of the auger is reversed (as by moving the valve handle (12.5) to its upward position), whereupon rotation of the auger tends to unthread the auger from the packed particulate material. The degree of upward axial movement that is provided the auger and auger tube within the outer tube permits the auger to slide axially upwardly within the outer tube as it rotates. The rotation of the auger in this reversed, unthreading direction thus does not require any significant movement of the particulate mass and hence requires comparatively little power. In its upward position, as shown in FIG. 5, the auger and auger tube are positioned within the outer tube, thereby being freed of the packed particulate mass. Subsequent reversal of the direction of rotation of the auger permits the lower end of the auger to freshly bite into the packed particulate material so that the same may be augered upwardly through the auger tube. The extent to which the helical threads of the auger protrude into the packed particulate mass may be regulated and adjusted, as now will be understood, by the proper positioning of the positioning pins (15.1 in FIG. 3) within the small orifices (15) in the guide pins (14.7) so that proper augering may proceed.

FIG. 4 shows the auger assembly with the auger and auger tube in its downwardly extended position for augering particulate material. FIG. 5 depicts the same augering assembly in its uppermost position, the shoulders (14.9) carried by the guide pins (14.7) abutting the lower surface of the upper wall (18.4) of the bracket plate (18.2). The auger and auger tube may be removed from the assembly for replacement of damaged parts or the like simply by removing the shoulders (14.9) and pulling the auger and auger tube axially upwardly out of the confining outer tube.

In the preferred embodiment described above, the outer tube (16) serves to guide the auger tube and provides a protective enclosure for the lower end of the auger tube when the latter has been withdrawn axially upwardly as shown in FIG. 5. It is contemplated that the outer tube (16) may be considerably shortened or even omitted if desired. In this embodiment, however, it is desirable to employ means such as a guide collar mounted within the bin to guide and maintain the lateral position of the auger tube as the latter moves axially. In yet another modification, the auger (comprising the rotatable shaft and helical ribbon) may be permitted limited axial movement within the auger tube. In this embodiment, the auger tube (14) is attached, as by welding, within a bin or similar container. A portion of the auger shaft (12.1) adjacent its upper end is free of attached helical ribbon, and slides smoothly axially through a seal carried by the plate (14.1) at the top of the auger tube. Means are provided to enable the auger motor housing to move axially but not rotationally with respect to the auger tube, such means being provided by an assembly analogous to the flange (14.6), guide pins (14.7) and bracket plate (18.2) of the previously described embodiment, the flange (14.6) in the instant embodiment being carried by the housing of the auger motor (12.2) rather than by the auger tube.

Various other embodiments of the invention will be evident to those skilled in the art.

While a preferred embodiment of the present invention has been described, it should be understood that various changes, adaptations and modifications may be made therein without departing from the spirit of the invention and the scope of the appended claims.

What is claimed is:

1. An auger assembly for transporting particulate material from a bin or the like and comprising an auger rotatable about its axis, a stationary tube having a particle-receiving end and within which the auger is rotatably moveable and freely axially moveable between a first position in which an end of the auger protrudes from the particle-receiving end of the tube and a second position in which an end of the auger is within the particle-receiving end of the tube, means for rotating the auger to draw particulate material within the particle-receiving end of the tube, means for reversing the direction of rotation of the auger to unthread the auger from particulate material adjacent the particle-receiving end of the tube and causing the auger to move axially toward the second position, and limit means limiting the free axial movement of the auger with respect to the tube between said first and second positions.

2. An auger assembly for transporting particulate material from a bin or the like and comprising an auger rotatable about its axis, an auger tube sheathing the auger and having a lower, particle-receiving end, the tube permitting free axial movement therewithin of the auger in response to rotational engagement of the auger with the particulate material, means for supporting the auger with respect to the bin or the like and permitting rotational and free axial movement of the auger within the auger tube, means for limiting the free axial movement of the auger between a first position in which an end of the auger protrudes from the particle-receiving end of the tube and a second position in which said end of the auger is within the particle-receiving end of the tube, means supporting the auger tube against rotation thereof, and means for reversing the direction of rotation of the auger to unthread the auger from particulate material adjacent the particle-receiving end of the tube and causing the auger to move axially toward the second position.

3. An auger assembly for transporting particulate material such as grain or fertilizer from a bin or the like, comprising an auger rotatable about its axis, an auger tube sheathing the auger and having a particle-receiving end, means for rotationally supporting the auger in the auger tube so that an end of the auger protrudes from the particle-receiving end of the tube, means for preventing axial movement of the auger with respect to the auger tube, an outer tube within which the auger tube is freely axially slideable, means for limiting the relative axial positions of the auger and the outer tube between a first position in which the protruding end of the auger extends from the outer tube and a second position in which the end of the auger is within the end of the outer tube, and means for reversing the direction of rotation of the auger to unthread the auger from particulate material adjacent the particle-receiving end of the auger tube and causing the auger and auger tube to move axially toward the second position.

4. An auger assembly for transporting particulate material such as grain or fertilizer from a bin or the like and comprising an auger rotatable about its axis, an auger tube sheathing the auger and having particle-receiving and discharge ends, means for rotating the auger in one direction to draw particulate material within the particle-receiving end of the auger tube, a stationary protecting outer tube within which the auger and auger tube are freely axially moveable as a unit, means preventing relative rotation of the auger tube with respect to the auger tube, means for limiting the free axial movement of the auger and auger tube with respect to the outer tube between a first position in which the end of the auger protrudes from the end of the outer tube nearest the particle-receiving end of the auger tube and a second position in which said end of the auger is within the end of the outer tube, and means for reversing the direction of rotation of the auger to unthread the auger from particulate material adjacent the particle-receiving end of the auger tube and causing the auger and auger tube to move axially toward the second position.

5. The auger assembly of claim 4 including means for adjusting the limit means to vary the limits between which the auger may axially move.

6. An auger assembly attachable to a bin or the like for transporting particulate material therefrom and comprising an auger having a helical ribbon attached to an elongated shaft, an auger tube sheathing the auger and having particle-receiving and particle-discharge ends, means for rotating the auger in one direction with respect to the auger tube to draw particulate material within the receiving end of the auger tube, and means for reversing the rotation of the auger to unthread the same from particulate material at the particle-receiving end of the auger tube, an outer protective tube within which the auger tube is axially slideably received, the outer tube having an end adjacent the particle-receiving end of the auger tube, means for stationary mounting of the outer tube to and within a bin or the like, means for preventing relative rotation between the outer tube and the auger tube while permitting axial movement therebetween, and means limiting axial movement of the auger between a first position at which the auger protrudes from said end of the outer tube and a second position at which the auger is withdrawn within the outer tube.

* * * * *